March 26, 1968 D. B. AYRES ETAL 3,375,450

PEAK DETECTOR WITH AUTOMATIC NOISE LEVEL ADJUSTING MEANS

Filed April 29, 1964

INVENTORS.
DAVID R. SUTTON
DOUGLAS B. AYRES
BY Henry L. Hanson
ATTORNEY.

United States Patent Office 3,375,450

Patented Mar. 26, 1968

3,375,450

PEAK DETECTOR WITH AUTOMATIC NOISE LEVEL ADJUSTING MEANS

Douglas B. Ayres, Cochituate, and David R. Sutton, Framingham, Mass., assignors to Minneapolis-Honeywell Regulator Company, Minneapolis, Minn., a corporation of Delaware Filed Apr. 29, 1964, Ser. No. 363,392
9 Claims. (Cl. 328—150)

ABSTRACT OF THE DISCLOSURE

A circuit for detecting the peak amplitude occurrence of each of a plurality of sequentially applied signal pulses and having a signal detection stage whose noise discrimination level is set to and sustained at a high or a low value in accordance with the peak amplitude of the immediate preceding signal pulse.

The present invention relates in general to signal detection apparatus and in particular to a peak amplitude signal detection circuit having a circuit means for self-adjusting the noise discrimination level in the detection circuit.

For many electronic system applications, such as for magnetic digital signal recording and reading systems, apparatus is required that will detect the peak occurrence of recovered information pulses in a signal waveform which also contains noise pulses of a smaller, yet significant, amplitude. In the past, recorded magnetic signal detection circuits, commonly referred to as sense amplifier circuits, have included a noise rejection stage. This stage was characterized by having a preset conduction threshold level usually formed by a fixed value of reverse-biasing potential, which discriminated against low-level noise pulses. As long as the noise pulses had a peak amplitude below the fixed conduction level of the noise rejection stage, they could not be coupled to a subsequent peak detector stage to form erroneous output signals.

Such prior-art circuits, however, worked properly only when the peak amplitude of the information pulses remained above the preset conduction threshold level. If, because of variations in the proximity of the magnetic record medium to the record or playback heads, or because of variations in the magnetic recording surface parameters, the peak amplitude of the recovered information pulses decreased below the preset conduction threshold level of the noise rejection stage, valid information signals were inadvertently discarded.

Another known circuit for rejecting playback noise pulses included an integration circuit, usually comprising a condenser which was charged to a level dependent upon the average peak amplitude of the incoming information pulses. The resulting charge established across the condenser by the information pulses was used to determine an appropriate noise rejection level for subsequently applied input pulses. Sense amplifiers of this type, however, are insensitive to rapid changes in the input pulse levels and are also limited to use with recording systems which provide a pulse during each bit cell period, or signal detection period, which can be used to establish the proper charge across the condenser. If the binary signal recording technique provides a pulse only upon the occurrence of a selected unit of binary information as, for example, upon the occurrence of a binary "one" signal, then a string of concurrent binary "zero" signals would not provide the proper charge for the condenser. Consequently, such a detection circuit attains its minimum noise rejection setting and becomes susceptible to subsequently occurring noise pulses, even those having a low peak amplitude.

It is therefore an object of the present invention to provide a signal detection circuit having an improved means for automatically selecting the required noise rejection level.

Still another object of the present invention is to provide a new and improved peak detector circuit whose noise rejection level is established by the peak amplitude of the preceding input pulse.

A further object of the present invention is to provide a sense amplifier capable of automatically selecting and maintaining a high or a low noise discrimination level to assure optimum peak signal sensing.

The foregoing objects of the present invention are accomplished by a circuit that comprises a pair of signal detection stages each coupled to a source of magnetically recorded input pulses. The first detection stage has a fixed conduction threshold level which is set slightly below the normally expected peak level of a recovered information pulse. The second signal detection stage is capable of selectively having either a high or a low conduction level, and has its output coupled to a peak detection stage. By appropriate gating structure, the conduction threshold level of the second detection stage is made dependent upon the peak amplitude of the preceding input pulse. If the preceding input pulse has a peak amplitude in excess of the conduction threshold level of the first detector stage, which will be the case under normal operating conditions, then the second detector stage will be set to and sustained at its high threshold conduction level. If, on the other hand, the preceding input pulse fails to exceed the threshold level of the first detector stage, then the second detector stage will be set to and maintained at its low threshold level for the next subsequently applied input pulse. Unlike the prior art sense amplifier circuits, it is possible to select the proper noise rejection level solely on the basis of the peak amplitude of the preceding input pulse, and to sustain the selected noise rejection level for an indefinite time, independent of the presence or absence of further input pulses.

It is therefore a further more specific object of the present invention to provide a new and improved signal peak detection circuit which comprises a signal threshold adjusting means which is adapted to be automatically adjusted for each signal pulse received in accordance with the amplitude of the immediately preceding pulse.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated a preferred embodiment of the invention.

Figures 1, 2, 3:
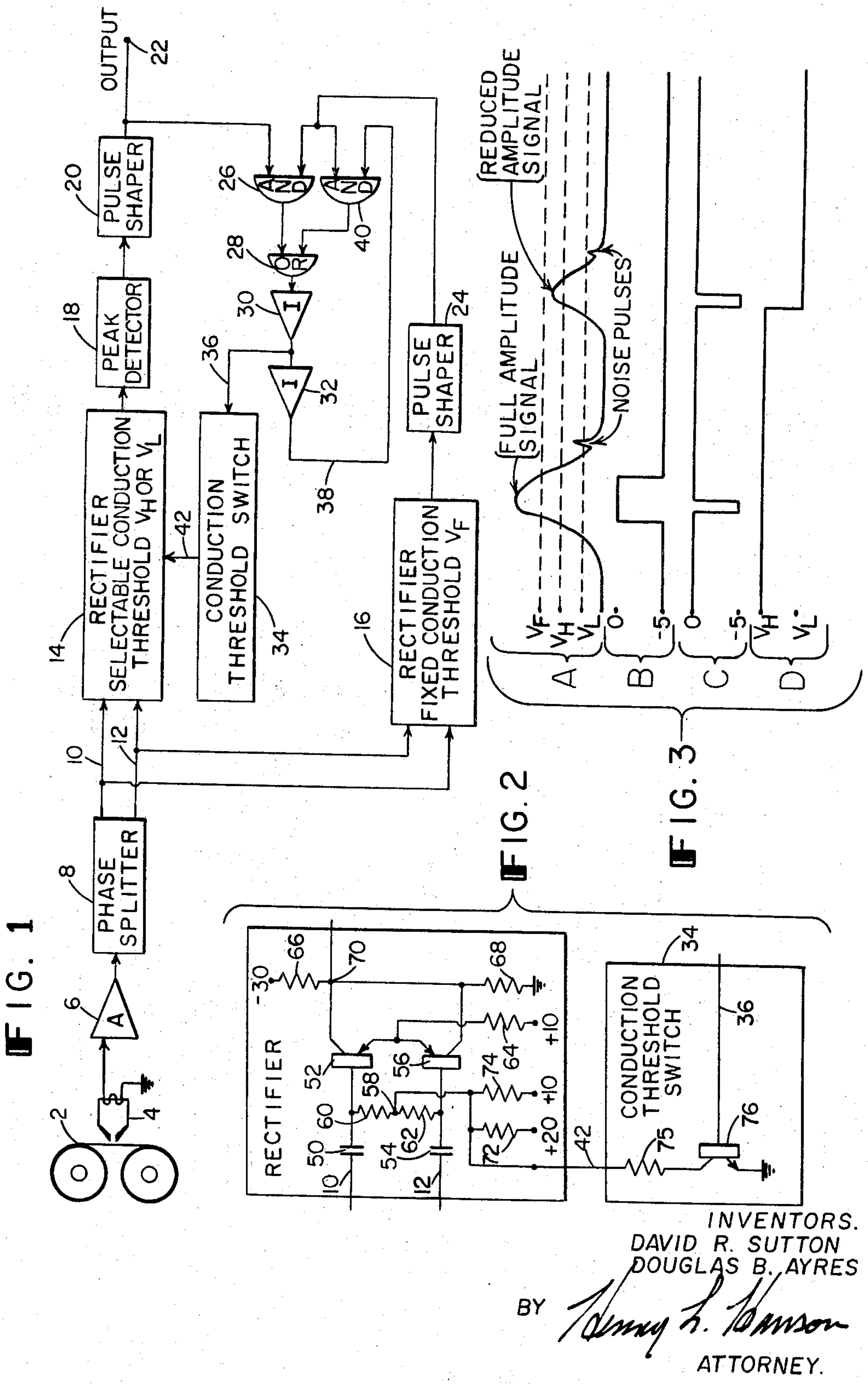
FIGURE 1 is a block diagram representation of a preferred embodiment of the present invention.
FIGURE 2 is a schematic drawing of the rectifiers and conduction threshold switch shown in block diagram form in FIGURE 1.
FIGURE 3 illustrates typical waveforms which are helpful in forming an understanding of the operation of the present invention.

Referring now to FIGURE 1, there is here illustrated a magnetic tape transport 2 which has an associated playback head 4 coupled to an amplifier 6, of conventional design. Output signals from the amplifier 6 are thereafter coupled to a phase-splitter 8 which provides paraphase signals on the lines 10 and 12. The paraphase signals are concurrently coupled to a pair of full-wave rectifier circuits 14 and 16, each of which includes means for establishing a reverse-biasing level, or conduction threshold level, which must be overcome by the input pulses in order to derive an output signal therefrom. A full-wave rectifier circuit which may be used for the rectifiers 14 or 16 of FIGURE 1 is shown in FIGURE 2 and is described in detail below.

The output signals from the rectifier 14 are thereafter coupled to a peak detector 18 which causes an output signal to be formed as the peak excursions of the signals are applied thereto. One such peak detector circuit which may be used for this purpose has been described by Robert R. Leonard in his patent application entitled "Information Handling Apparatus," filed Oct. 9, 1961, bearing Ser. No. 143,781, now Patent No. 3,248,560, and assigned to the assignee of the present invention. Output signals from the peak detector are thereafter coupled to a pulse shaper 20 which provides pulses of a desired polarity and duration at the output terminal 22, which pulses occur in synchronism with the peak occurrence of the recovered bipolar signals from the magnetic tape transport apparatus 2.

As previously noted, the paraphase output signals from the phase-splitter 8 are also coupled via leads 10 and 12 to another rectifier circuit 16. Output signals on the rectifier 16 are thereafter coupled to a pulse shaper 24, which provides output pulses of a desired polarity and waveshape. Pulse shaper circuit 24, may, for example, be a high-gain transistor amplifier stage which becomes fully conductive at low values of input signals applied thereto. The output pulses from the pulse shapers 24 and 20 are coupled to respective ones of the input leads of an AND gate 26. The output lead of the gate 26 forms one of a pair of input leads for an OR gate 28, which in turn has its output lead coupled to the input of a pair of cascaded inverter stages 30 and 32. The output of the inverter 30 is coupled to the control element of a conduction threshold switch 34 via the lead 36. The output of the inverter stage 32 is coupled via a regenerative feedback line 38 to an input of an AND gate 40. The other input for the AND gate 40 is derived from the output of pulse shaper 24. The output lead of gate 40 is connected to the other input lead of OR gate 28.

Before discussing the operation of the circuit of FIGURE 1, reference should be had to the more detailed schematic representation of the rectifier circuit of FIGURE 2, which may be used for the rectifiers 14 or 16 of FIGURE 1. The rectifier of FIGURE 2 has its input signals supplied by the leads 10 and 12. Lead 10 is coupled via condenser 50 to the base element of a transistor 52. Similarly, lead 12 is connected via condenser 54 to the base element of a transistor 56. The base elements of transistors 52 and 56 are jointly coupled to a common terminal 58 via the resistors 60 and 62 respectively. The emitters of the transistors 52 and 56 are each coupled to one terminal of a resistor 64, the latter having its other terminal connected to a positive 10-volt biasing potential. The collectors of transistors 52 and 56 are each coupled to the junction 70 of the resistors 66 and 68, and to the rectifier output lead. The other end of resistor 66 is connected to a negative biasing source, while the other end of resistor 68 is connected to a ground reference terminal. The junction point 58 is connected to a voltage divider circuit comprising the resistors 72 and 74 whose free-end terminals are connected to positive biasing potentials of 20 and 10 volts respectively.

As previously mentioned, the rectifier described in FIGURE 2 may be used for the rectifiers 14 or 16 of FIGURE 1. In instances where it is to be used as the rectifier 14 in FIGURE 1, the junction point 58 is further connected, via a lead 42, to one end of a resistor 75 of the conduction threshold switch 34. The other end of resistor 75 is connected to the collector of a transistor 76, the latter having its emitter connected to ground and its base connected to an input lead 36. When the rectifier of FIGURE 2 is to be used as the rectifier 16 of FIGURE 1, the conduction threshold switch 34 and coupling lead 42 are not required.

Considering now the operation of the rectifier circuit of FIGURE 2, it will be noted that the base elements of transistors 52 and 56 are maintained at a positive potential with respect to their respective emitter elements due to the biasing action of the voltage divider formed by the resistors 72 and 74. Therefore, paraphase input signals applied to the rectifier via the leads 10 and 12 must exceed the reverse-biasing potential, or conduction threshold level of the rectifier prior to deriving an output signal therefrom. It will be noted only one of the transistors 52 or 56 will be conductive at any given time, depending upon which of the input leads 10 or 12 has the negative going input signal. Low level noise signals which occur on the input leads 10 and 12, however, are prevented from being coupled from the output lead of the rectifier due to the conduction threshold level established by the reverse-biasing potential of the transistors 52 and 56.

In order to provide a selectable conduction threshold level, such as required when the rectifier is used as the rectifier 14 of FIGURE 1, the junction 58 of FIGURE 2 is further coupled to a transistor switch 76 which, when activated, lowers the reverse-biasing voltage and consequently, the conduction threshold level of the rectifier. The conduction threshold switch 34 will be activated upon application of a control signal at its input lead 36.

Returning now to FIGURE 1, the bilevel signals induced in the pickup head 4 and amplified by amplifier 6, are thereafter coupled to a phase-splitter 8 which provides signals of opposite phase at its output leads 10 and 12. The paraphase signals on lines 10 and 12 are concurrently coupled to the rectifiers 14 and 16. FIGURE 3A illustrates a pair of pulses, the first being of full amplitude and the second of reduced amplitude, as they would appear at the outputs of rectifiers 14 and 16 in the absence of a reverse-biasing potential established therein. The conduction threshold level $V_F$ in FIGURE 3A is the level which must be exceeded before an output signal is derived from the rectifier 16. The conduction threshold levels $V_H$ and $V_L$ indicate the high and low conduction threshold levels capable of being selected in rectifier 14. It will be initially assumed that the rectifier 14 is in its high threshold conduction level $V_H$, i.e., that the conduction threshold switch 34 is deactivated. Since both the full amplitude signal and the reduced amplitude signal shown in FIGURE 3A exceed the conduction level $V_H$, rectifier 14 will become conductive during a portion of the applied pulses to couple signals to the peak detector 18. The peak detector forms a negative-going signal in the vicinity of the peak excursion of the signals applied thereto. Output signals from peak detector 18 are thereafter coupled to pulse shaper 20 to provide negative-going signals of a desired duration at the terminal 22, which signals are shown in FIGURE 3C.

The full amplitude signal of FIGURE 3A will also exceed the conduction level $V_F$ of rectifier 16. The output signal therefrom is coupled to the pulse shaper 24 to provide the positive-going signal shown in FIGURE 3B. Note, however, that the reduced amplitude signal, which does not exceed $V_F$, will not cause an output signal to be formed from the rectifier 16, as evidenced by the absence of simultaneously occurring positive-going signals on the waveform of FIGURE 3B. The noise pulses shown on the trailing edge of each of the rectified input signals do not affect circuit operation since, in each instance, they are of insufficient amplitude to exceed the selected conduction level $V_H$ or the fixed conduction level $V_F$.

Output pulses from pulse shapers 20 and 24 are each coupled to the inputs of AND gate 26 which provides a negative-going output signal, or becomes conductive, when each of its input signals is simultaneously at a negative 5-volt level. When a full amplitude pulse is applied to the signal detection circuit of FIGURE 1, and is subsequently rectified, the conduction of rectifier 16 causes one of the inputs to AND gate 26, i.e. the input from pulse shaper 24, to attain ground level. Since the AND gate 26 is not conductive when its input from the pulse shaper 24 is at a ground level, then the signal on lead 36 remains at the proper level to sustain the threshold switch 34 in its non-conducting state. As a result, rectifier 14 will remain in its high conduction threshold level $V_H$, as indicated by the waveform of FIGURE 3D.

Consider next the operation of the signal detection circuit upon the application thereto of the reduced amplitude pulse of FIGURE 3A. In this instance, the fixed conduction threshold level $V_F$ of rectifier 16 is never reached and consequently, the output signal from pulse shaper 24 which is applied to one input of AND gate 26 remains at its negative value. The reduced amplitude signal will, however, exceed the conduction threshold level $V_H$ of rectifier 14 to produce a negative-going signal from peak detector 18. This signal, after processing through the pulse shaper 20, is applied to the other input terminal of AND gate 26 to satisfy the conditions required for the conduction of the gate 26 and the coupling of a negative output signal therefrom. This negative-going signal is coupled via OR gate 28 to the input of the inverter stage 30. The inverter stage 30 now changes conductive state to couple a signal, on its output lead 36, capable of activating the conduction threshold switch 34. The conduction threshold switch now provides a signal on its output lead 42 which brings about the change of the reverse-biasing potential and consequently, a lowering of the conduction threshold level established by the rectifier 14 to the level $V_L$. This change in the conduction threshold lever from its high value $V_H$ to a lower value $V_L$ is illustrated in FIGURE 3D.

At the reduced-amplitude signal level of FIGURE 3A, the noise pulses, which are proportionately reduced in amplitude, will not exceed the lower threshold level $V_L$. Consequently, they will not be coupled to the peak detector 18 to form erroneous output signals. The peak amplitude of input signals, however, may decrease further to the level $V_L$ and still be properly detected by the present detection system.

In order to sustain the rectifier 14 at the conduction level $V_L$, the output signal from inverter 30 is coupled to a second inverter stage 32, the latter having its output signal coupled via a regenerative feedback line 38 to one input of AND gate 40. Since the other input of AND gate 40 from the pulse shaper 24 is at a negative level, as illustrated in FIGURE 3B, there will be a regenerative signal applied back to the inverter 30 to sustain it in its newly established conductive state. The inverter stages 30 and 32, together with the gates 26, 28 and 40, may be considered to form a latching circuit which, once energized, is capable of sustaining itself in its energized state. The latching circuit is employed to sustain the conduction threshold switch in its conductive state until such time as a change of events, such as the subsequent application to the signal detection circuit of a full amplitude input signal. Since the regenerative feedback path depends upon the existence of a negative signal from the pulse shaper 24 to an input of AND gate 40, the application to the circuit of an input signal which exceeds the fixed conduction threshold $V_F$ of rectifier 16 will disrupt the feedback path and cause the conduction threshold switch to be deactivated. Thus, the return of the input signals to their full amplitude condition will cause the detection circuit to again assume its high noise rejection level.

Unlike the prior-art peak detector circuits, the present invention does not utilize a fixed noise rejection level which may not be the proper level for operation of the circuit under all input signal conditions, nor does it depend upon a particular recording technique which provides pulses during each bit cell period to provide means for integrating a number of input pulses to arrive at a noise rejection level. Instead, the present invention provides a high conduction threshold level for noise discrimination until such time as an input pulse has a peak amplitude below a fixed conduction level $V_F$. When this occurs, the noise rejection level is lowered and maintained at the lower value until such time as the input pulses again exceed a predetermined peak amplitude.

While the present invention has been implemented in a signal detection circuit adapted to recover bipolar information pulses, each polarity of which represents a particular unit of digital information, it will be apparent that the invention will work equally as well with unipolar input signals. With unipolar input signals, the rectifiers 14 and 16 may be replaced by amplifier stages having a reverse-biasing potential applied thereto and having means, in the case of the amplifier 14, to lower the reverse-biasing potential upon command of a signal applied thereto. Similarly, other types of pulse signal manipulating circuits may use the principles of the present invention to good advantage.

It will be apparent to those skilled in the art that other changes may be made in the apparatus described without departing from the spirit of the invention as set forth in the appended claims and that in some cases, some features of the invention may be used to advantage without a corresponding use of other features.

Having now described the invention, what is claimed as new and novel and for which it is desired to secure Letters Patent is:

1. In combination, an input terminal, first and second rectifier circuits coupled to said input terminal, each of said rectifier circuits having a preset conduction threshold level, a peak detector having its input coupled to the output of said second rectifier and its output coupled to an output terminal, gating means connected to receive the output from said peak detector and said first rectifier circuit, and switching means connected to the output of said gating means and to said second rectifier circuit operable to decrease the conduction threshold level of said second rectifier circuit, said switching means being rendered active by the presence of an output signal from said peak detector and the absence of an output signal from said first rectifier circuit.

2. Signal detection apparatus comprising an input terminal, first and second signal detection circuits coupled to said input terminal, said first and second signal detection circuits each having a preset conduction threshold level, a peak detector coupled between said second detection circuit and an output terminal, means connected to said first detection circuit and said peak detector for gating the output signal of said peak detector and the output signal of said first detection circuit, and switching means coupled between said last-named means and said second detection circuit and operable to decrease the preset conduction threshold of the latter, said switching means being activated upon the presence of an output signal from said peak detector and absence of an output signal from said first detection circuit.

3. Apparatus as set forth in claim 2 wherein the preset conduction level of said first detection circuit is greater than that of said second detection circuit.

4. Apparatus as set forth in claim 2 and further comprising means for sustaining said switching means in its activated state until the occurrence of an output signal from said first detection circuit.

5. In combination, a pulse manipulating circuit for handling a plurality of sequentially occurring signal pulses, said circuit having an input, an output and signal threshold control means, and means connected to said input and said output to respond to the pulse amplitude of each sequentially occurring signal pulse, said last-named means comprising a bilevel signal-producing circuit being connected to said threshold control means to adjust the signal threshold to a high or low level directly in response to each occurring pulse.

6. Pulse detection apparatus comprising an input terminal, first and second threshold responsive amplifier circuits having their inputs coupled to said input terminal, said first amplifier circuit having a preset conduction threshold level, said second amplifier circuit selectively having a high or a low conduction threshold level, a peak detector having its input coupled to the output of said second amplifier circuit and its output coupled to an output terminal, first and second gate circuits each having a pair of input leads and an output lead, means coupling the output of said peak detector and said first amplifier circuit to respective ones of said first gate input leads, a latching circuit, said latching circuit having an input, an output and a regenerative feedback lead, means coupling the output leads of said first and second gate circuits to the input of said latching circuit, means coupling the output lead of said first amplifier circuit and said regenerative feedback lead of said latching circuit to respective ones of said second gate input leads, and means coupling the output lead of said latching circuit to said second amplifier circuit to selectively control the conduction threshold of the latter.

7. Signal detection apparatus comprising an input terminal adapted to receive pulses representative of pre-recorded digital information, first and second amplitude discriminatory stages each connected to said input terminal, said first amplitude discriminatory stage having a preset condution threshold level adapted to reject input signals below a predetermined amplitude, said second amplitude discriminatory stage normally having a high conduction threshold level, said level being of a lower magnitude than said preset conduction level, a peak detector having its input coupled to the output of said second amplitude discriminatory stage and its output coupled to an output terminal, first and second AND gates each having a pair of gate input leads and a gate output lead, means coupling the output of said peak detector and said first amplitude discriminatory stage to respective ones of said first gate input leads, electronic switch means having its control lead coupled to the output lead of said first and second gate circuits and its output lead coupled to said second amplitude discriminatory stage, said switch means being activated upon the occurrence of an output signal from said peak detector and absence of an output signal from said first amplitude discriminatory stage, said switching means operable to lower the conduction threshold level of said second amplitude discriminatory stage, means coupling the output of said first amplitude discriminatory stage to a first one of said second gate input leads, and means for regeneratively coupling the output of said switch means to the other one of said second gate input leads, said second gating circuit operable to sustain said switch means in its activated state until an output signal is derived from said first amplitude discriminatory stage.

8. A tape sense amplifier system comprising an input terminal adapted to receive bipolar pulses representative of pre-recorded binary signals, first and second full-wave rectifier units each connected to said input terminal, said first rectifier unit having a preset conduction threshold level adapted to reject input signals below a predetermined amplitude, said second rectifier unit selectively having a high or a low conduction threshold level, each of said levels being of a lower magnitude than said preset conduction level, a peak detector having its input coupled to the output of said second rectifier unit and its output coupled to an output terminal, first and second AND gates each having a pair of gate input leads and a gate output lead, means coupling the output of said peak detector and said first rectifier unit to respective ones of said first gate input leads, electronic switch means having its control lead coupled to the output lead of said first and second gate circuits and its output lead coupled to said second rectifier unit, said switch means being activated upon the occurrence of an output signal from said peak detector and absence of an output signal from said first rectifier unit, said switching means operable to change the conduction threshold level of said second rectifier unit from its high to its low conduction threshold level, means coupling the output of said first rectifier unit to a first one of said second gate input leads, and means for regeneratively coupling the output of said switch means to the other one of said second gate input leads, said second gating circuit operable to sustain said switch means in its activated state until an output signal is derived from said first rectifier unit.

9. In combination, a pulse manipulating circuit for handling a plurality of sequentially occurring signal pulses, said circuit having an input, an output and signal threshold control means, means connected to said input and said output to respond to the pulse amplitude of each sequentially occurring signal pulse, said last-named means comprising a bilevel signal-producing circuit being connected to said threshold control means to adjust the signal threshold to a high or low level directly in response to each occurring pulse, and latching means connected to said bilevel signal-producing circuit to selectively hold said circuit in one of its bilevel states.

References Cited

UNITED STATES PATENTS

| | | | |
|---|---|---|---|
| 2,855,513 | 10/1958 | Hambugen et al. | 328—150 |
| 2,992,340 | 7/1961 | Floyd | 307—88.5 |
| 3,095,541 | 6/1963 | Ashcraft | 328—15 |

JOHN S. HEYMAN, *Primary Examiner.*